June 7, 1927.
A. KATZINGER
COVERED BAKING PAN
Filed Sept. 9, 1926
1,631,734
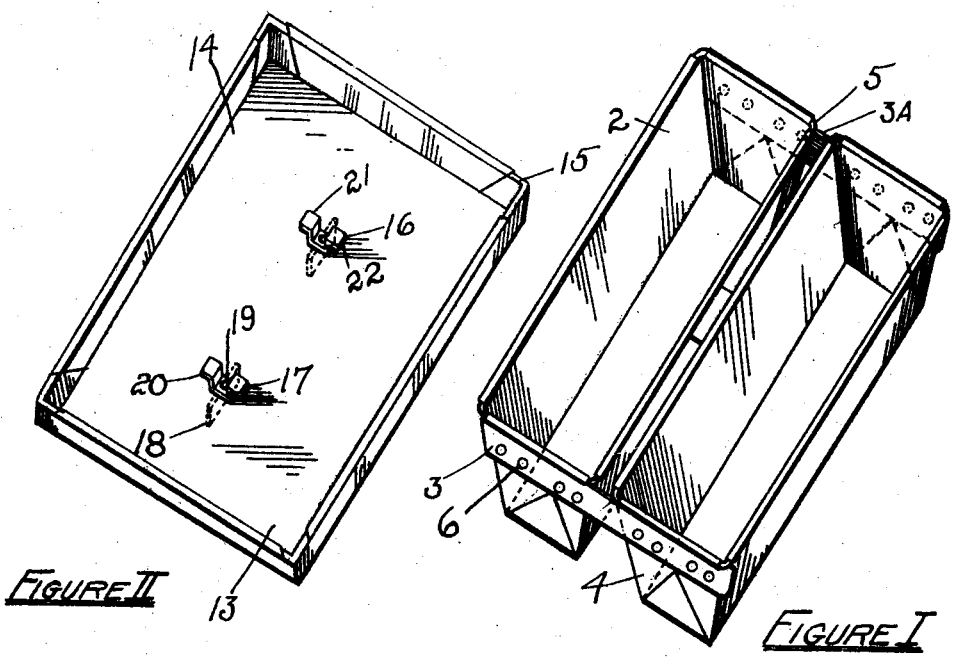
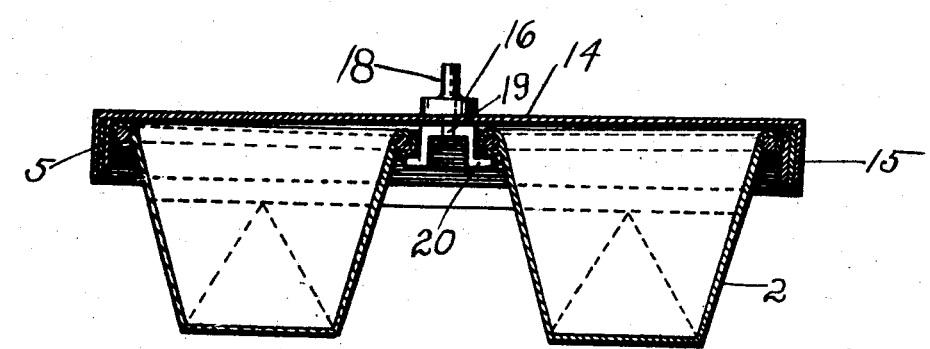
ARTHUR KATZINGER,
INVENTOR.
RW Darrah,
ATTORNEY Patented June 7, 1927.

1,631,734

UNITED STATES PATENT OFFICE.

ARTHUR KATZINGER, OF CHICAGO, ILLINOIS, ASSIGNOR TO EDWARD KATZINGER COMPANY, OF CHICAGO, ILLINOIS.

COVERED BAKING PAN.

Application filed September 9, 1926. Serial No. 134,487.

This invention relates to a combination of pans and cover with certain attachments therefor which may be employed for a variety of purposes, but particularly in connection with the baking of bread or related products.

The equipment which forms the basis of this invention is frequently used in connection with that form of bread which is known as the Pullman loaves or the sandwich loaves. These loaves are usually relatively long and have a substantially square cross-section. They are flat on the top instead of arched as are many other loaves.

One of the objects of this invention is to provide a cover for a multiple group of pans and arrange means for easily, quickly and simply fastening the cover to the set of pans in such a manner that it will not be accidentally detached and yet may be readily removed when desired. Another object is to so design the pans and cover so the loaf baked in the pan will be substantially flat on all sides including the top. Other objects are to provide means for holding the cover in place during handling and against the pressure exerted by the rising loaf of bread.

Further objects are to provide a structure which will be unusually strong and durable, but at the same time as light and inexpensive as possible. Other objects are to provide attaching means which will successfully resist the blows and distortion incidental to normal service conditions. Other objects will be apparent from the disclosures which follow and the accompanying drawing.

In the manufacture of certain kinds of bread, it is customary to produce a loaf in which the sides are substantially flat and the angles between the sides are substantially 90°, providing, however, a certain amount of taper or draft for the ready removal of the loaf from the pan.

In forming such a loaf it is, of course, necessary to cover the top of the pan as otherwise the top of the loaf would have the ordinary curved or arched shape which is common in uncovered loaves.

In producing such a loaf an effort is made to put just sufficient dough in the pan so that when it rises during the baking process, the pan will be completely filled. The amount of raw dough placed in the pan, of course, only partially fills it prior to baking.

As the bread rises it, of course, exerts a pressure on the cover of the pan which pressure, providing the cover remains in place, serves to force the loaf into the corners forming a square true loaf of the desired shape. It sometimes happens due for example to the over-proofing of the dough, the variation in the amount, nature or proportion of the ingredients in the dough, that considerable pressure is exerted upon the pan cover. In order to counteract this pressure it is, therefore, desirable to attach the pan cover to the pans in some manner which will resist a considerable amount of pressure.

In the past this result has been secured by making the top cover heavy and relying upon the weight of the cover to hold it in place. Various objections are apparent to such a procedure. Various types of spring fastenings have also been proposed and used some of which are quite successful, but none of which appear to be absolutely permanent and durable owing to the depreciation and distortion of the equipment.

My invention is designed to overcome the difficulties mentioned above and to secure the objects previously enumerated and hereafter set forth.

One form of my invention is shown in the accompanying drawing which forms a part of this specification.

In the drawing Figure I shows a perspective view of two pans while Figure II shows a perspective view of an inverted cover designed to cooperate with the pair of pans shown in Figure I. Figure III shows a sectional view of the pans with the cover in place.

I have shown in the drawing a multiple pan set made up of two individual pans, but it will be apparent that any number of pans may be included in the set by modifying the size of the frame, the cover and the arrangement of the clips to suit. It will also be apparent that the sizes, shapes and details of the pans and cover may be varied at will without departing from the spirit of my invention.

Referring more specifically to the drawing, I have shown the pans (2) held together with straps (3) and (3ᵃ). The pans may be made by any method as for example by the conventional process of folding a sheet of tin plate (4) and rolling the upper edges round the heavy wire frame (5).

The ends of the pans are folded in and held by rivets (6) while a pair of straps (3) and (3ᵃ) extend along the short edges of the pan by rivets (6) which thus serve a double purpose.

Cover (13) is made from a sheet of heavy metal (14) formed by bending over and around a rectangular strap (15). The exact detail of construction of the pan and cover are not essential to this invention.

A series of rotatable clips (16) and (17) are attached to cover (13). Clip (16) consists of a handle member (18) provided with a shaft or pivot (19) which passes through sheet (14) and is attached to catch member (20) by riveting over, or other equivalent means.

It will be evident that clip member (16) may be rotated about the axis of member (18).

In placing the cover on the set of pans the catch member (20) is rotated into such position that it will enter the space between two adjacent pans.

When in place the handle member (18) is turned thereby turning the catch member (20) so that the legs (21) and (22) of catch member (20) engage with the adjacent rims of the two pans. Obviously this position holds the cover firmly in place so that it cannot be detached by any conditions likely to arise in service.

However, when it is desired to remove the cover from the pan this may be quickly accomplished by simply rotating handle member (18).

It will be apparent that this construction does not depend upon the spring or resilience of the metal and is free from the marginal variations which frequently affect spring clips of all types.

It will be apparent this construction is inexpensive to make, but very durable and effective. It will be apparent that this construction will withstand any forces which may be exerted by the rising bread.

It will be obvious that this structure may be modified in many ways without departing from the spirit of this invention. Thus any number of pans may be included in a set and any desired number of catches may be used. The position of the catches may be altered as desired and the exact form of their structure may be modified in many obvious ways.

Having now fully disclosed my invention what I claim as new and wish to secure by Letters Patent in the United States is as follows:

A multiple of pans attached together to form a unit, a reinforced lip extending outwardly around the upper edges of each of said pans, a detachable cover for said pans carrying a rotatable catch attached to its inner surface at a substantial distance from the edge of the cover with a handle for said rotatable catch extending through the outer surface, said catch being located so as to engage the adjacent lips of two adjacent pans.

ARTHUR KATZINGER.